United States Patent [19]
Farley

[11] 3,995,544
[45] Dec. 7, 1976

[54] TUNA SQUEEZER AND STRAINER UTENSIL

[76] Inventor: D. Gray Farley, 5803 Holmby Court, Cypress, Calif. 90630

[22] Filed: Apr. 3, 1975

[21] Appl. No.: 564,690

[52] U.S. Cl. .............................. 100/116; 100/213; 210/464; 210/470; D7/47

[51] Int. Cl.² ...................... B30B 9/02; B01D 35/00

[58] Field of Search .......................... 100/104–116, 100/122–135, 213; 99/495; 210/464–476, 232, 237, 238; 222/189; D7/47

[56] References Cited

UNITED STATES PATENTS

| | | | |
|---|---|---|---|
| 34,241 | 1/1862 | Codding | 100/116 |
| 333,484 | 12/1885 | Stewart | 210/477 |
| 1,048,546 | 12/1912 | Ketcham | 210/470 |
| 1,158,276 | 10/1915 | Pieper | 100/116 |
| 1,195,370 | 8/1916 | Larsen | 100/116 |
| 1,669,284 | 5/1928 | Chetham | 210/470 |
| D105,367 | 7/1937 | Swordling | D7/47 |

FOREIGN PATENTS OR APPLICATIONS

| | | | |
|---|---|---|---|
| 791,529 | 12/1935 | France | 99/495 |
| 18,632 | 8/1902 | United Kingdom | 210/469 |
| 416,141 | 9/1934 | United Kingdom | 210/471 |

*Primary Examiner*—Peter Feldman
*Attorney, Agent, or Firm*—Fulwider, Patton, Rieber, Lee & Utecht

[57] ABSTRACT

There is disclosed an utensil that is useful for the separation of liquid from subdivided solid comestibles, typically, for the separation of oil and liquid from canned meats such as tuna and the like. The device comprises a generally cup-shaped member having a cylindrical wall conforming to the internal diameter of a standard can size and an end, circular wall which is perforated to provide permeability to liquid while blocking passage of subdivided solid comestibles. The side walls distally support tab means which project radially outwardly from the side walls to provide for grasping of the press whereby the press can be inserted into a can, compressed against the contents therein and then rotated into an inverted position to permit unimpeded drainage from the can.

8 Claims, 7 Drawing Figures

U.S. Patent    Dec. 7, 1976    3,995,544
FIG.1
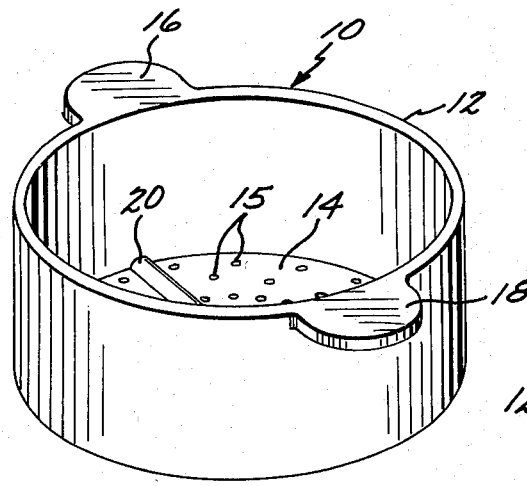
FIG.2
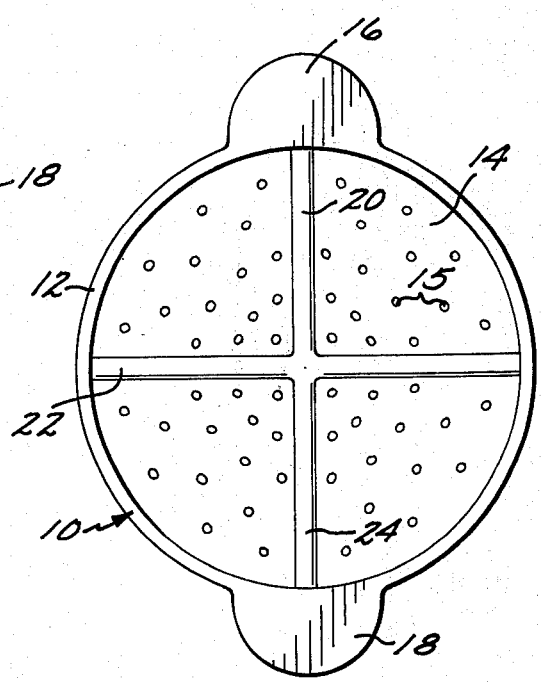
FIG.3
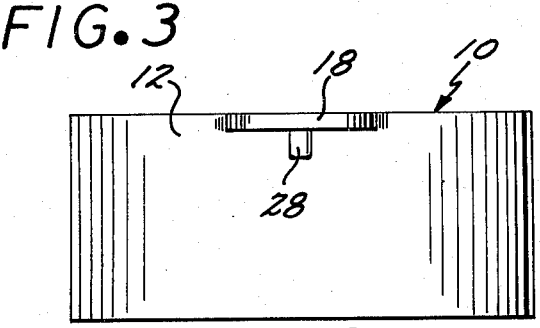
FIG.4
FIG.7
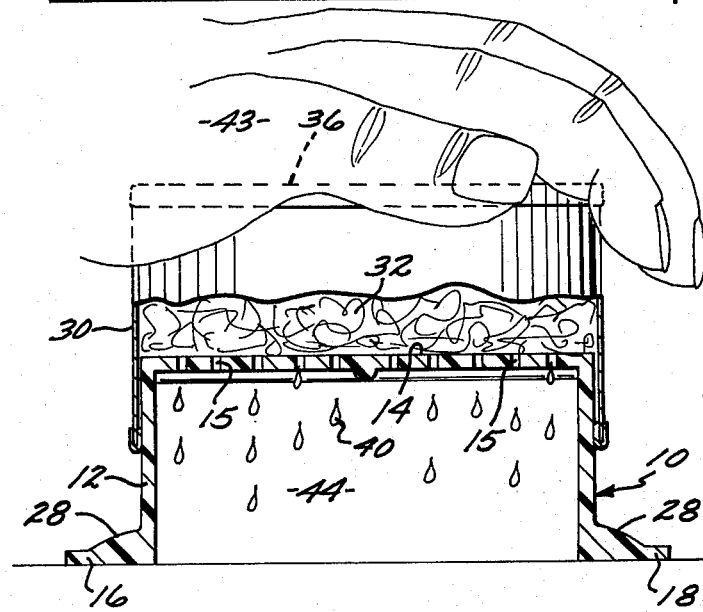
FIG.5
FIG.6
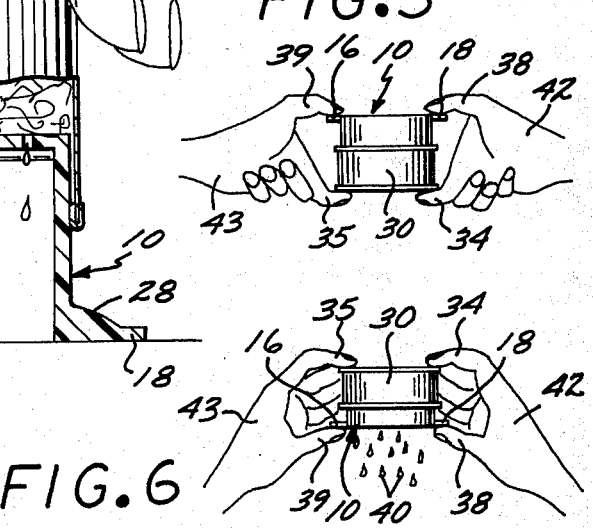

TUNA SQUEEZER AND STRAINER UTENSIL

BACKGROUND OF THE INVENTION

1. Field of Invention

This invention relates to a household utensil and, in particular, to a utensil useful for separation of liquid from solid comestibles.

2. Brief Statement of the Prior Art

Many solid comestibles such as meats, fish, e.g., tuna, salmon, and the like, are canned with a relatively high content of liquid broth, gravy, oil and the like. It is often necessary or desirable to separate the liquid from the solid comestibles during food preparation and such separation is frequently achieved by holding the lid, after it has been cut from the can, against the can contents and inverting the can to permit drainage of the liquid. This procedure is messy, and hazardous because of the sharp edges of the cut lid. Some attempts have been made to provide a drainage utensil, however, these attempts have not been notably successful, particularly, because the devices employed have been cumbersome and difficult to use, clean and store.

Accordingly, there exists a need to provide a simple, inexpensive and compact device which can be employed as a press for the forced separation of liquid from solid comestibles which are received in conventionally sized can containers. Such a device should have provision for its facile use, preferably, provision for single handed use.

BRIEF STATEMENT OF THE INVENTION

The present invention is a simple and inexpensive household utensil that can be conveniently employed as a press or can be also used as a strainer for effecting separation of liquid from solid comestibles. The device comprises a cup member having cylindrical side walls of a diameter closely conforming to the internal diameter of conventional size cans and a circular end wall carried on one end thereof. The circular end wall bears a plurality of apertures uniformly distributed thereover and extending through the end wall to provide a flow area permeable to liquids, but insufficient to permit passage of subdivided solid comestibles. The device is also constructed to permit simple operation and, to this end, the side walls bear at least one and, preferably, two tabs distally from the circular end wall and projecting radially outwardly from the side wall. The tabs provide means for grasping of the press whereby the press can be inserted into a can of comestibles, forced into compression against the contents therein and then rotated into an inverted position to permit unimpeded drainage from the can.

BRIEF DESCRIPTION OF THE DRAWINGS

The invention will be described with reference to the figures of which:

FIG. 1 is a perspective view of the household appliance of the invention;

FIG. 2 is a plan view of the appliance;

FIG. 3 is an elevation view of the household appliance;

FIGS. 4, 5 & 6 illustrate the manner of use of the household appliance; and

FIG. 7 illustrates use of the appliance in effecting liquid separation from comestibles within a can.

DESCRIPTION OF PREFERRED EMBODIMENTS

Referring now to FIG. 1, the household utensil of the invention is illustrated at 10 as a generally cup-shaped member formed by a cylindrical side wall 12 with an integral, circular end wall 14 secured thereto. The end wall 14 bears a plurality of apertures 15 which are uniformly distributed across its surface and which extend through the end wall 14 to provide permeability to liquids. The side wall 10 also bears, distally from end wall 14, tab means in the form of at least one tab projection 16 which extends radially outwardly from the side wall 12. Preferably, another tab means 18 is carried by side wall 12, opposite from tab means 16. The utensil can also bear reinforcement means such as ribs 20–26 which extend radially across the inside surface of end wall 14 to provide reinforcement thereto.

As illustrated in FIG. 3, the tab means such as 18 can also bear reinforcement means in the form of fillet member 28 on its undersurface to provide rigidity to the tab means.

The device is preferably manufactured of molded plastics such as molded polyolefins, e.g., polyethylene, polypropylene, etc., and is formed by conventional injection molding techniques. The cylindrical side wall 12 is formed of a diameter closely conforming to the internal diameter of the conventional sized can for which the device is to be used. Typically, fish such as tuna and the like are marketed in a number 6 size can having an internal diameter of 3 3/16 inches and the cylindrical side wall 12 is therefor formed with an outer diameter of about 3.125 inches which is adequate to permit insertion of the cylindrical side wall 12 into the can while preventing the extrusion of solid and liquid comestibles through the annular space between the cylindrical side wall 12 and that of the conventional can container. The outer diameter of the device should only be less than the internal diameter of the can by a tolerance which is necessary to permit free axial or rotational movement of the utensil in the can container. Typically, this tolerance is from 0.01 to about 0.10 inch, preferably from 0.03 to 0.07 inch, for most conventional size can containers.

The apertures 15 in the circular end wall 14 of the device are sized with sufficient flow area to provide permeability to aqueous and oleaginous liquids without permitting passage of subdivided solid comestibles. Typically, these holes have a diameter from about 0.02 to about 0.2 inch and, most preferably, the apertures are about 0.07 inch in diameter. These apertures are uniformly spaced across the end wall and a sufficient number are provided to permit the rapid and relatively unimpeded drainage of liquid from the container, thereby insuring that the liquid drains through the apertures and not through the narrow annular space between wall 12 and the internal wall of the can container. In the aforementioned typical embodiment for use with canned tuna and the like, a total of 54 apertures having a diameter of about 0.0625 inch are employed.

As previously mentioned, the device can be formed of molded plastics which is the preferred construction. In such construction the device is an integral, one-piece item. The wall thicknesses employed can generally be from 0.05 to about 0.2, preferably about 0.1 inch. The end wall 14 is of similar thickness and, preferably, is braced by the ribs 20–26 which are of a thickness comparable to that of the walls.

Referring now to FIGS. 4 to 6, the employment of the utensil will be further described. As illustrated in FIG. 4, can 30 of mixed liquid and solid comestibles has been opened and receives, in its open end 31, the utensil 10. The utensil is placed within container 30 by the user who can grasp the tabs such as tab 18.

As illustrated in FIG. 5, the utensil 10 is forced into container 30 in the simple operation with the user's hands 42 and 43 grasping the assembly of utensil 10 and container 30 with thumbs 38 and 39 resting on tabs 18 and index fingers 34 and 35 supporting the undersurface of container 30. The assembly can then simply be rotated into the inverted position shown in FIG. 6, and during this movement the user's hands remain entirely out of contact with the liquid drained from the container 30 and removed from contact with any sharp edges of container 30 resulting from the cutting of the container lid from container 30. The user can then press the utensil 10 against the contents 32 of can 30 while holding the assembly over a bowl or drain area to force or squeeze the liquid from the solid contents 32 of the can 30.

In this fashion the utensil 10 can be pressed against the solid comestibles 32 within container 30 to forcefully separate liquid as droplets which pass through apertures 15 of end wall 14. As so used, the assembly grasped within the user's hands can be held over a dish or container for the collection of the separated liquid or over a drain area such as the drain of a kitchen sink and the like, to discard the separated liquid 30. Since the annular space or clearance between the side wall 12 of the utensil and the inside container wall is minimal, and since adequate liquid flow area is provided by apertures 15, substantially all the liquid drains through apertures 15 and does not contact the user's hands or fingers.

As shown in FIG. 7, the utensil can be employed as a press resting on a supporting surface for effecting the forced separation of liquid from solid comestibles contained within a conventional size can container 30. As there illustrated, the assembly of can 30 and utensil 10 is rested on a flat surface such as the bottom of a dish and the like and pressure can be applied with the palm 46 and/or heel 48 of hand 43 to the bottom wall 36 of the container to forcefully separate liquid 40 which can be collected beneath end wall 14. The side wall 12 provides an elevated support for end wall 14 and provides an open space 44 for free drainage from can 30.

To permit hand grasping of the assembly of can container 30 and utensil 10, the height of side wall 12 is limited to no greater than about half of the open spread distance of an average person's hand, i.e., about 3 inches. The side wall 12 should be of sufficient height to permit substantial movement into the can container and, therefore, is from about 0.75 to about 3 inches, preferably, from about 1 to about 2 inches. This provides overall dimension ratios of height to diameter from about 0.25 to about 1.5, preferably from 0.3 to about 0.7 inch, for most applications.

Investigations employing the press utensil in the manner previously described have demonstrated that from 50 to 75% more liquid can be forced from a typical tuna pack than can be separated relying only on drainage, thereby resulting in a dryer and flakier solid meat portion with a considerable reduction in caloric content.

An additional advantage of the utensil of this invention is that it can also be employed for various household applications for washing or drainage of liquids from solid comestibles. In this application, the device can be used in its inverted position, illustrated in FIG. 1, as a collander or sieve.

The invention has been described by reference to the presently preferred embodiments thereof. It is not intended that the invention be unduly limited by this description of the illustrated and preferred embodiment. Instead, it is intended that the invention be defined by the means, and their obvious equivalents set forth in the following claims.

What is claimed is:

1. A utensil for the separation of liquid from subdivided comestibles within a right cylindrical can container of conventional size which comprises:
   a right cylinder cup member having a ratio of height to diameter from 0.25 to about 1.5 and having smooth and flat cylindrical side walls, said diameter closely conforming to the internal diameter of said can container to be in substantial contact with the internal wall of said can container when placed therein and provide an annular space therebetween of minimal width, and a circular end wall carried thereon;
   a plurality of apertures uniformly distributed about said end wall and extending therethrough, the total flow area of said apertures being sufficient relative to the area of said annular space to provide free liquid flow through said apertures to the substantial exclusion of liquid flow through said annular space and the area of each of the apertures being insufficient to permit passage of said subdivided solid comestibles; and
   a pair of tab members, one each carried on opposite sides of said cylindrical side wall distally of said end wall and projecting radially outwardly therefrom to provide means for grasping of said utensil whereby said utensil can be inserted into said container, axially forced into compression against the contents therein and rotated into an inverted position to permit unimpeded drainage from said can.

2. The utensil of claim 1 formed of molded plastics.

3. The utensil of claim 1 wherein said end wall is of thin wall construction with a plurality of reinforcement ribs radially extending there across.

4. The utensil of claim 1 wherein said apertures have diameters from about 0.02 to about 0.15 inch.

5. The utensil of claim 4 wherein said apertures have a diameter of about 0.06 inch.

6. The utensil of claim 1 having a ratio of height to diameter from 0.3 to about 0.7.

7. The utensil of claim 1 inserted within a cylindrical can container having an internal diameter from 0.01 to 0.1 inch greater than the outside diameter of said utensil.

8. The utensil of claim 1 inserted within a cylindrical can container having an internal diameter from 0.03 to 0.07 inch greater than the outside diameter of said utensil.

* * * * *